(12) United States Patent
Rudenko

(10) Patent No.: US 10,501,327 B2
(45) Date of Patent: Dec. 10, 2019

(54) NANOSTRUCTURES WITH FUNCTIONALLY DIFFERENT SURFACES

(71) Applicant: Pavlo Rudenko, Colfax, WA (US)

(72) Inventor: Pavlo Rudenko, Colfax, WA (US)

(73) Assignee: Pavlo Rudenko, Colfax, WA (US)

( * ) Notice: Subject to any disclaimer, the term of this patent is extended or adjusted under 35 U.S.C. 154(b) by 174 days.

(21) Appl. No.: 13/905,066

(22) Filed: May 29, 2013

(65) Prior Publication Data

US 2013/0323507 A1 Dec. 5, 2013

Related U.S. Application Data

(60) Provisional application No. 61/654,089, filed on Jun. 1, 2012.

(51) Int. Cl.
| | | |
|---|---|---|
| *C01B 33/26* | (2006.01) | |
| *B29B 9/00* | (2006.01) | |
| *B82Y 30/00* | (2011.01) | |
| *C01B 33/22* | (2006.01) | |
| *C01B 33/38* | (2006.01) | |
| *B29L 31/00* | (2006.01) | |

(52) U.S. Cl.
CPC ............... *C01B 33/26* (2013.01); *B29B 9/00* (2013.01); *B82Y 30/00* (2013.01); *C01B 33/22* (2013.01); *C01B 33/38* (2013.01); *B29L 2031/7562* (2013.01); *Y10T 428/2982* (2015.01)

(58) Field of Classification Search
None
See application file for complete search history.

(56) References Cited

U.S. PATENT DOCUMENTS

| | | | | |
|---|---|---|---|---|
| 6,954,235 | B1 * | 10/2005 | Russell et al. | 349/38 |
| 7,122,842 | B2 * | 10/2006 | Hill | 257/86 |
| 2003/0066998 | A1 * | 4/2003 | Lee | B82Y 10/00 257/19 |
| 2005/0051777 | A1 * | 3/2005 | Hill | 257/72 |
| 2006/0240227 | A1 * | 10/2006 | Zhang | B82Y 15/00 428/195.1 |
| 2010/0065818 | A1 * | 3/2010 | Kim et al. | 257/14 |
| 2010/0092809 | A1 * | 4/2010 | Drzal | H01M 4/0416 429/413 |
| 2011/0111947 | A1 * | 5/2011 | Natsui | C01G 23/006 501/137 |
| 2011/0170208 | A1 * | 7/2011 | Zhao | F41H 5/00 252/582 |
| 2011/0186817 | A1 * | 8/2011 | Bowers | H01L 21/2225 257/29 |
| 2011/0210308 | A1 | 9/2011 | Kim et al. | |
| 2013/0177503 | A1 * | 7/2013 | Bao | 424/9.32 |

FOREIGN PATENT DOCUMENTS

| | | |
|---|---|---|
| CN | 1398925 | 2/2003 |
| CN | 1510088 | 7/2004 |

(Continued)

OTHER PUBLICATIONS

PCT Search Report and Written Opinion from PCT/US/2013/043805 (counterpart of this application) dated Sep. 19, 2013, 8 pages in English.

(Continued)

*Primary Examiner* — Ronak C Patel

(57) ABSTRACT

Disclosed is a substantially flat nanosheet with a first side and a second side, the first side having substantially different properties than the second side. The nanosheet may have self-assembly properties under certain anisotropic conditions such as phase separation boundaries, sheer stresses, friction, temperature gradients, viscosity, density, and/or combinations therein.

14 Claims, 1 Drawing Sheet

(56) References Cited

FOREIGN PATENT DOCUMENTS

| CN | 1978096 A | 6/2007 |
|---|---|---|
| CN | 101121828 | 2/2008 |
| CN | 102300705 | 12/2011 |
| RU | 2347841 C2 | 3/2009 |
| RU | 2421394 C1 | 6/2011 |
| RU | 2434043 C1 | 7/2011 |
| WO | 2000/015545 A1 | 3/2000 |

OTHER PUBLICATIONS

The European Office Action dated Sep. 7, 2014 for European patent application No. 1379853.8, a counterpart foreign application of U.S. Appl. No. 13/905,066, 7 pages.
The Extended European Search Report dated Aug. 20, 2015 for European patent application No. 13798053.8, 4 pages.
Database WPI Week 201058 Thomson Scientific, London, GB, Jul. 8, 2010, 8 pages.
Translated Chinese Office Action dated Oct. 13, 2015 for Chinese Patent Application No. 201380028992.2, a counterpart foreign application of U.S. Appl. No. 13/905,066, 16 pages.
Si et al., "Controlled-Synthesis, Self-Assembly, Behavior, and Surface-Dependent Optical Properties of High-Quality Rare-Earth Oxide Nanocrystals," Chem. Mater., vol. 19, No. 1, American Chemical Society, 2007, pp. 18-27.
Translated Chinese Office Action dated Jul. 7, 2016 for Chinese Patent Application No. 201380028992.2, a counterpart foreign application of U.S. Appl. No. 13/905,066, 19 pages.
The European Office Action dated Mar. 11, 2016 for European patent application No. 13798053.8, a counterpart foreign application of U.S. Appl. No. 13/905,066, 7 pages.

\* cited by examiner

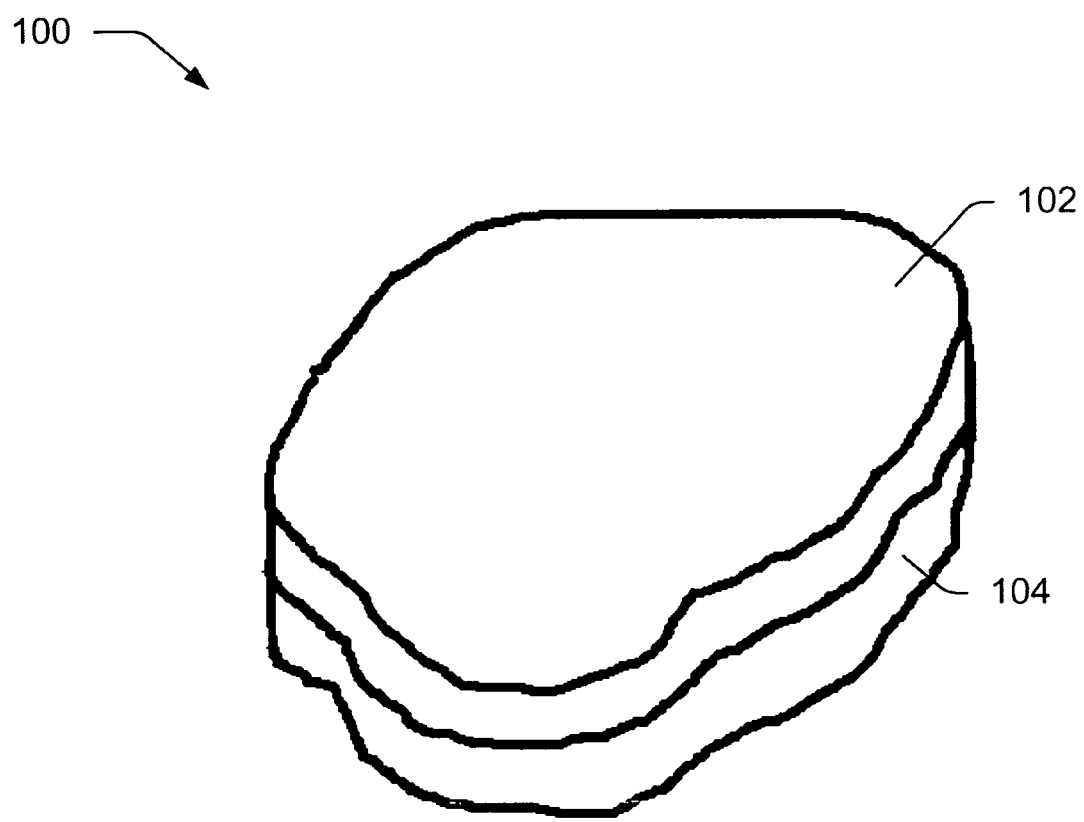

NANOSTRUCTURES WITH FUNCTIONALLY DIFFERENT SURFACES

This application claims the benefit of U.S. Provisional Application No. 61/654,089, filed Jun. 1, 2012, which is incorporated herein by reference in its entirety.

BACKGROUND

The present disclosure is related to the field of nanotechnology and materials science. Nanotechnology may include nanostructures, the chemical compositions of nanostructures, devices that include nanostructures and specific uses of nanostructures which may possess special properties that originate from structure's physical size. Particularly, the present disclosure is directed towards nanosheets.

BRIEF DESCRIPTION OF THE DRAWING

The detailed description is set forth with reference to the accompanying FIGURE.

The FIG. 1 is a perspective view of a nanostructure comprising a first functional surface and a second functional surface.

DETAILED DESCRIPTION

Overview

While there are many examples of nanostructures that have original properties based on size alone, this disclosure presents an approach wherein the new properties originate not only from the nanostructure's size, but also from the shape of the nanostructures and their surface properties. Nanostructures according to this disclosure may possess anisotropic properties that lead to their ability to exhibit self-assembly under conditions such as, but not limited to, phase boundaries, shear stresses, friction, differences in surface tension, and/or temperature gradients. Such self-assembling properties are not typically displayed by bulk materials of the same chemistry.

This disclosure describes a three-dimensional object with at least a first dimension less than 100 nanometers, and second and third dimensions substantially greater than 100 nanometers. The object may comprise a first surface and a second surface, the first surface having substantially different properties than the second surface. The different surface properties may be the result of different chemical structures or the same chemical structure with different orientations, crystal structures, defects, substitute dopants or other features that may lead to substantial differences in properties. By way of example and not limitation, the surface properties may include, surface termination, surface energy, hydrophilicity, thermal conductivity, coefficients of thermal expansion, reactivity and conductivity. By employing different features on the first surface and the second surface of the object, the particulate matter comprising the object may be configured to have a combination of different surface properties.

In some embodiments, the object may be built using a top-down approach or, in other embodiments, the object may be built using a bottom-up approach.

Multiple and varied example implementations and embodiments are described below. However, these examples are merely illustrative, and other implementations and embodiments of a nanostructure with functionally different surfaces may be implemented without departing from the scope of the disclosure.

Illustrative Nanostructure with Functionally Different Surfaces

The embodiments shown in the FIG. 1 is presented by way of example. The components shown in the FIG. 1 may be combined as desired to create a nanostructure with functionally different surfaces having various configurations. The components shown in the FIGURES may be rearranged, modified, duplicated, and/or omitted in some configurations.

Embodiment One

As illustrated in the FIG. 1, some embodiments may use a top-down approach in preparing a nanostructure 100 with different properties on a first side 102 and a second side 104. A 1:1 layered material, such as a member of the phylosillicates group, may be provided. Phylosillicate group members may include, but are not limited to, kaolinite, serpentinite, and chlorite. The crystalline structure of this 1:1 layered material may comprise structurally different layers. A mechanical grinding technique may be employed to reduce the particle size of the material. The material may exhibit lamellar dehydration properties. Lamellar dehydration may occur at certain temperatures when alternating layers of a hydrated material dehydrate preferentially while the other layers stay hydrated. After initial particle reduction (e.g., by the mechanical grinding technique), layer separation can be achieved by applying ultrasound, heat treatment, shear stress, electromagnetic field or other methods, either separately or combined.

In one specific example, serpentine powder of a lizardite variety was dry-ground into a powder with an average particle size of less than 1 micron using a Spex SamplePrep® 8000M High Energy Ball Mill. After grinding, the powder was heated to 400° C. for eight hours to produce lamellar dehydration. The weight of the sample decreased by three to four percent, while full dehydration leads to thirteen percent weight loss. The resulting powder was then dispersed into ethanol and sonicated using a Cole-Parmer® 300 W Ultrasonic Processor for one hour. The resulting flakes were observed to have a distorted magnesium oxide structure on one side and a tetrahedral silica structure on the other side. In some embodiments, the side comprising magnesium oxide may attach to a metals' surface, exposing the silica side on the outside.

Embodiment Two

In a second embodiment, nanostructures with two different sides can be synthesized using a bottom-up approach, such as the direct synthesis of layered nanosheets with subsequent modification of one side of the nanostructure.

In one specific example, finely ground forsterite powder was mixed with sodium metasilicate and subjected to microwave hydrothermal synthesis at 250° C. in a Biotage® Advancer Kilobatch Microwave Pressure Reactor for three hours. The resulting powder was dispersed in ethanol using a 300 W ultrasonic processor. Sedimentation was used to separate synthesized nanosheets from larger host particles of forsterite.

Other methods may be used to generate nanostructures with a first side having substantially different properties than a second side. Some example methods may include lithography, chemical or plasma vapor deposition of a material on one of the first side or the second side of the nanostructure. For example, gold or platinum may be deposited on nanosheets of talc or molybdenum disulphide.

CONCLUSION

Although this disclosure uses language specific to structural features and/or methodological acts, it is to be understood that the scope of the disclosure is not necessarily limited to the specific features or acts described. Rather, the specific features and acts are disclosed as illustrative forms of implementation.

What is claimed is:

1. A composition of matter consisting of a three dimensional object in a form of a layered nanosheet with one dimension less than 100 nanometers, and second and third dimensions greater than 100 nanometers, wherein the layered nanosheet is unbounded to surrounding objects, and wherein the layered nanosheet consists of a first layer having a first property; wherein the first layer comprises a first composition of matter including magnesium oxide, and wherein the first property comprises a first surface termination; a second layer having a second property, wherein the first property being different than the second property, the second layer comprises a second composition of matter different than the first composition of matter the second composition of matter includes tetrahedral silica, and the second property comprises a second surface termination different than the first surface termination.

2. The nanostructure of claim 1, wherein the layered nanosheet is responsive to an anisotropic condition.

3. The nanostructure of claim 2, wherein the layered nanosheet exhibits self-assembly.

4. The nanostructure of claim 2, wherein the anisotropic condition to which the layered nanosheet is responsive comprises at least one of:
   a phase boundary;
   a shear stress;
   friction;
   a difference in surface tension; or
   a gradient in temperature.

5. The composition of matter of claim 1, wherein the first layer comprises a first chemical structure and the second layer comprises a second chemical structure different than the first chemical structure.

6. The composition of matter of claim 1, wherein the first layer comprises a chemical structure having a first orientation, and the second layer comprises the chemical structure having a second orientation different than the first orientation.

7. The composition of matter of claim 1, wherein the first layer comprises a first crystal structure and the second layer comprises a second crystal structure different than the first crystal structure.

8. The composition of matter of claim 1, wherein the first layer comprises a first defects or dopants and the second layer comprises a second defects or dopants different than the first defects or dopants.

9. The composition of matter of claim 1, wherein the first property comprises a first surface energy and the second property comprises a second surface energy different than the first surface energy.

10. The composition of matter of claim 1, wherein the first property further comprises a first hydrophilicity and the second property further comprises a second hydrophilicity different than the first hydrophilicity.

11. The composition of matter of claim 1, wherein the first property comprises a first thermal conductivity and the second property further comprises a second thermal conductivity different than the first thermal conductivity.

12. The composition of matter of claim 1, wherein the first property comprises a first coefficient of thermal expansion and the second property comprises a second coefficient of thermal expansion different than the first coefficient of thermal expansion.

13. The composition of matter of claim 1, wherein the first property comprises a first reactivity and the second property comprises a second reactivity different than the first reactivity.

14. The composition of matter of claim 1, wherein the first property comprises a first conductivity and the second property comprises a second conductivity different than the first conductivity.

* * * * *